United States Patent [19]

Fujino et al.

[11] 4,427,282
[45] Jan. 24, 1984

[54] MODE CHANGE OVER DEVICE FOR CAMERA

[75] Inventors: Masahisa Fujino, Musashino; Akio Sunouchi, Tokyo; Nobuyuki Suzuki; Ryuji Suzuki, both of Kawasaki, all of Japan

[73] Assignee: Canon Kabushiki Kaisha, Tokyo, Japan

[21] Appl. No.: 392,253

[22] Filed: Jun. 25, 1982

[30] Foreign Application Priority Data

Jul. 7, 1981 [JP] Japan ................................. 56-106404

[51] Int. Cl.³ ............................................. G03B 9/02
[52] U.S. Cl. .................................................. 354/271.1
[58] Field of Search ...................... 354/29, 30, 36, 37, 354/38, 40, 43, 44, 47, 270, 271–274, 289

[56] References Cited

U.S. PATENT DOCUMENTS

| 3,829,872 | 8/1974 | Ueda et al. ............ 354/272 X |
| 3,887,929 | 6/1975 | Imura .................. 354/47 X |
| 4,045,807 | 8/1977 | Ito et al. .............. 354/38 |
| 4,168,892 | 9/1979 | Ueda et al. ............ 354/271 X |
| 4,200,381 | 4/1980 | Ishizaka et al. .......... 354/38 X |

Primary Examiner—William B. Perkey
Attorney, Agent, or Firm—Toren, McGeady and Stanger

[57] ABSTRACT

A camera capable of changing its operational mode having an operation member for moving the diaphragm between the fully opened state and closed state comprises a lock mechanism for keeping the diaphragm in the fully opened state, the lock mechanism being released by a diaphragm closing operation of the operation member, with release of the lock mechanism being prevented when the camera is set in the shutter time preference mode.

3 Claims, 10 Drawing Figures

MODE CHANGE OVER DEVICE FOR CAMERA

BACKGROUND OF THE INVENTION

1. Field of the Invention

The present invention relates to a mode change over device for a camera, and more particularly to a safety means which prevents mode change over at certain camera settings.

2. Description of the Prior Art

Generally, cameras which are capable of operating in different photographing modes may be equipped to operate in the shutter time photographing mode, the aperture value preference photographing mode, the program photographing mode and the manual photographing mode. Also, the camera may be capable of a light measuring mode change over involving change over from the fully opened light measuring mode to the diaphragm closed light measuring mode. Furthermore, cameras are known which are capable of effecting both the photographing mode change over and the light measuring mode change over. Such known cameras are provided with a safety device in order to avoid erroneous selection of the modes. The type of erroneous selection contemplated might involve noncompatible mode selection such as selection of the diaphragm closed light measuring mode while in the shutter time preference photographing mode. One approach for preventing such erroneous selection involves the use of devices to mechanically prevent such errors. Thus, the operation of the change over means which is considered to cause the erroneous selection of the modes is prohibited and made impossible. However, in many cases, undue load is often imposed on the change over member because the photographer tries to continuously operate the operation member without recognizing that such operation has been made impossible. As a result, the durability of the member becomes a problem, and in the worst case, the camera is damaged. According to a second preventive measure which is applicable to a camera which is electrically released, the selection of the erroneous photographing mode is electrically deflected to prohibit the release operation. However, in many existing safety devices, problems arise because, while improper selection is prevented, there nevertheless arise other problems which may cause the loss of a photographic opportunity.

It is an object of the present invention to overcome the above shortcomings by providing a mechanism wherein the diaphragm closing button for selecting the diaphragm closed light measuring mode is rendered inoperative in the case where the camera is set in the shutter time preference photographing mode.

It is another object of the present invention to provide a mechanism which operates to set the manual photographing mode when, in the case where the camera is set in the diaphragm closed light measuring mode, the shutter time preference photographing mode is selected by mistake.

SUMMARY OF THE INVENTION

Briefly, the present invention may be described as a mode change over device for a camera having a diaphragm and capable of operating in a shutter time preference mode comprising: diaphragm closing means for bringing said diaphragm from a fully opened stated into a closed state; operation means for operating said diaphragm closing means, said operation means moving between a first position in which said diaphragm is brought into the fully opened state by said diaphragm closing means and a second position in which said diaphragm is brought into the closed state by said diaphragm closing means; lock means for locking said operation means in said first position; release means for releasing the locked state of said lock means; means for making the lock release operation of said lock means impossible; and mode selection means for controlling said means for making the lock release operation impossible, said mode selection means being operative when said shutter time preference mode is selected.

DETAILED DESCRIPTION OF THE PREFERRED EMBODIMENTS

Figure 1:
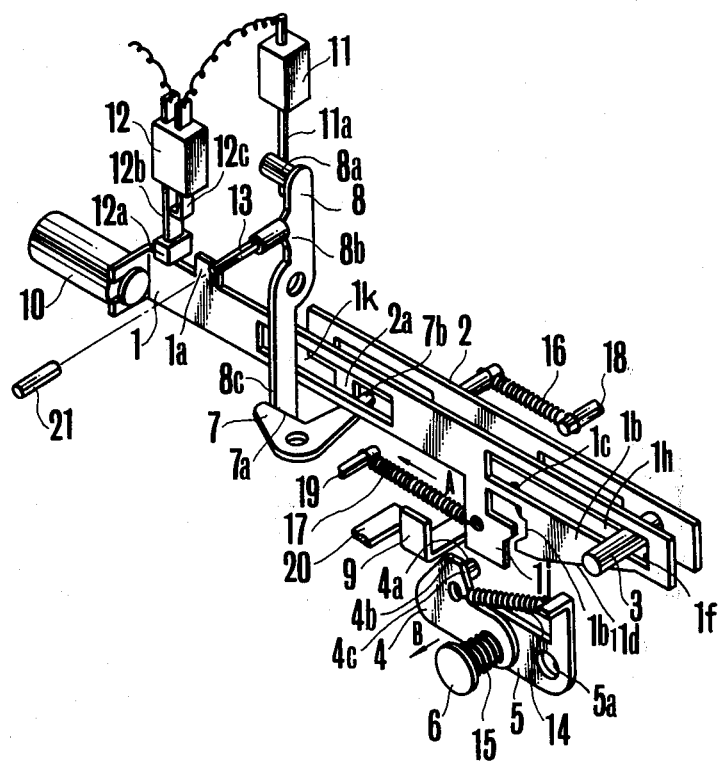
FIG. 1 is a perspective view showing an embodiment of the diaphragm closing change over device of the present invention.

The present invention is depicted in the accompanying drawings, and an embodiment thereof shown in FIG. 1 comprises a light measuring change over device for a camera which is capable of operation in the shutter time preference mode, in the aperture value preference mode, manually in the fully opened light measuring mode, as well as in the aperture value preference mode, and manually in the closed diaphragm light measuring mode. A diaphragm closing plate 1 manually operating an automatic diaphragm lever with a diaphragm closing button 10 has a projection 1a for operating a switch 12, a holding part 1b for holding a pin 4a a fully opened light measuring state, a bent part 1c for releasing the pin 4a, a sloped part 1d for permitting return of the pin 4a, an elongated hole 1k having an end part 1e, an elongated hole 1h having an end part 1f, and an edge 1g of a projection 1j.

A change over plate 2 is operatively engaged with an auto-manual signal pin 21 for the lens which projects with the shutter time preference photographing mode selection operation, whereby the change over plate 2 guides a secured pin 3 so as to prohibit the operation of a diaphragm closing lock plate 4.

The prohibiting pin 3 secured on the change over plate 2 is in contact with an end 4b of the diaphragm lock plate 4 in the fully opened light measuring shutter time preference photographing mode so as to prohibit the opening release operation of the diaphragm closing lock plate 4, which has a pin 4a connected with the holding part 1b of the diaphragm closing plate 1.

A base plate 5 is provided for the diaphragm closing lock plate 4 on which is secured a diaphragm closing lock plate shaft 6. An intermediary shaft 7 moves the diaphragm closing lock plate into the prohibiting position along with the projection of an auto-manual signal pin 21, and an auto-manual change over lever 8 operates the intermediary lever 7 with the projection of the auto-manual signal pin 21 changing over an auto change over switch 11 to "ON" with a secured pin part 8a, with 9 being the automatic diaphragm closing lever for closing the fully opened diaphragm down to a certain determined aperture value with the release operation and then automatically allowing the diaphragm open, whereby the automatic diaphragm closing lever 9 can also manually operate. A diaphragm closing button 10 operates as the operation member for changing over the fully opened light measurement and the closed diaphragm light measurement. The auto change over switch 11 is closed when the part 8a of the auto-manual change over lever 8 is connected to the part 11a which changes over the control circuit to the shutter time preference photographing mode when the diaphragm closing switch 12 is also closed. The diaphragm closing switch 12 is closed with the contact of the part 12b with the part 12c in the fully opened light measuring state and opened with the diaphragm closing operation of the diaphragm closing plate 1 so as to keep the control circuit in the manual photographing mode even if the auto change over switch 11 is closed, whereby the part 12a is brought into contact with the part 1a of the diaphragm closing plate 1. An auto-manual change over pin 13 is connected to the auto-manual signal pin 21 projecting with the shutter time preference photographing mode selection operation so as to operatively engage the auto-manual change over lever 8. A closed diaphragm releasing spring 14 urges the diaphragm closing lock plate 4 along the direction of its rotation. A diaphragm closing lock spring 15 urges the diaphragm closing lock plate 4 along the vertical direction, a change over plate spring 16 urges the change over plate 2 toward the fully light measuring position, a diaphragm closing spring 17 urges the diaphragm closing plate 1 along the direction along which the diaphragm is closed, and a change over plate spring hanger 18 is located on the side on which the change over plate spring 16 is secured. A diaphragm closing lever 20 of the lens closes the fully opened diaphragm down to the present aperture value and an auto-manual signal pin 21 of the lens projects with the shutter time preference photographing mode selection operation.

The operation of the mechanism described above will be explained with reference to FIGS. 2 to 9.

Figure 2:
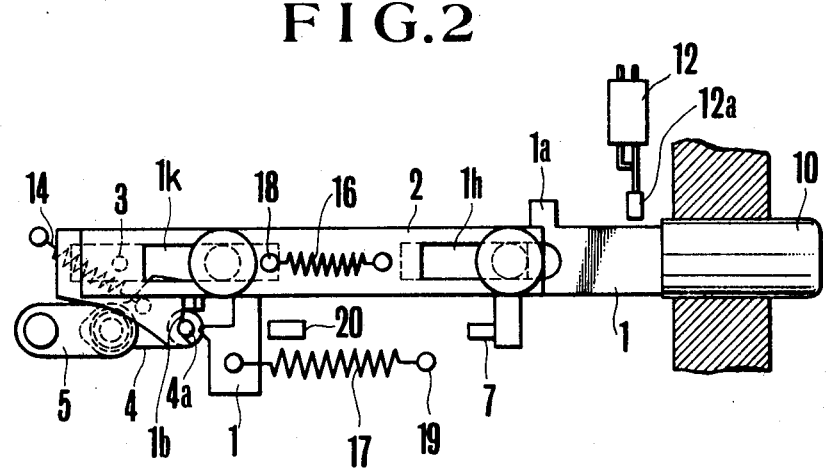
FIG. 2 is a plan view showing the change over mechanism of the device of FIG. 1 in the fully opened light measuring manual photographing mode.
Figure 3:
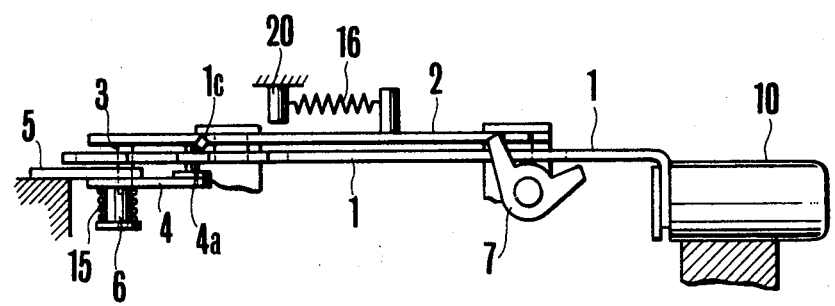
FIG. 3 is a side view of the mechanism shown in FIG. 2.
Figure 4:
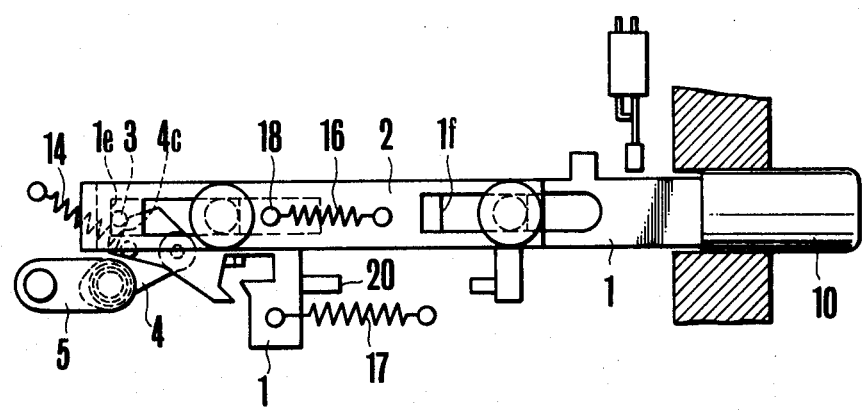
FIG. 4 is a plan view showing the change over mechanism of the device of FIG. 1 between the fully opened light measuring manual photographing state and the diaphragm closed light measuring manual photographing mode.
Figure 5:
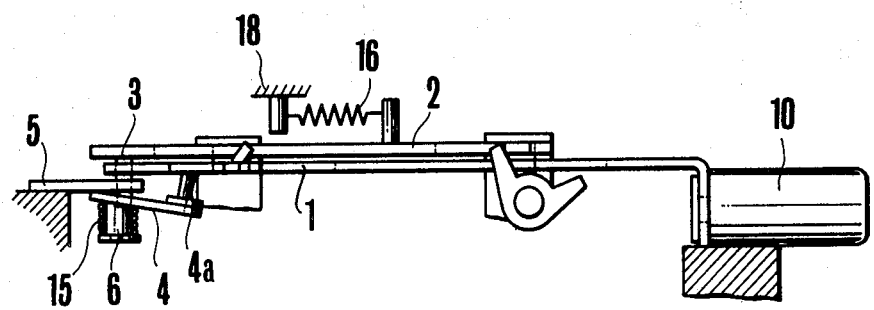
FIG. 5 is a side view of the mechanism shown in FIG. 4.
Figure 6:
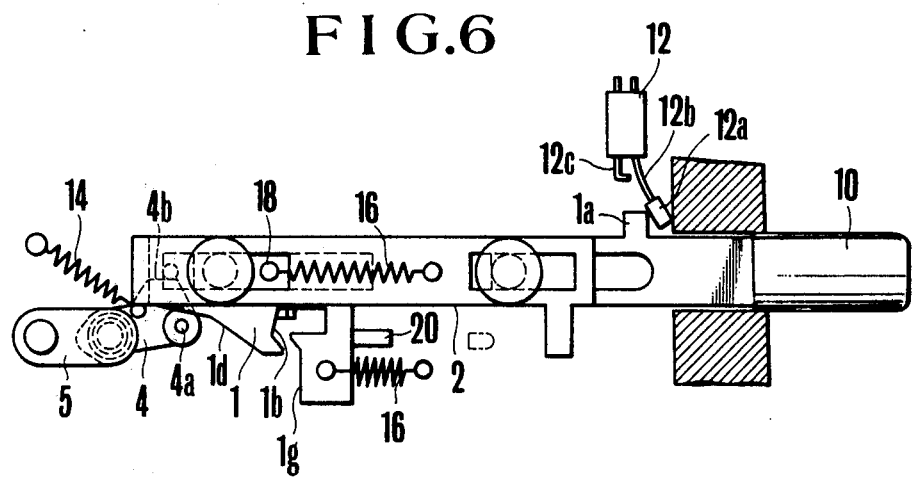
FIG. 6 is a plan view showing the change over mechanism of the device of FIG. 1 in the diaphragm closed manual photographing mode.
Figure 7:
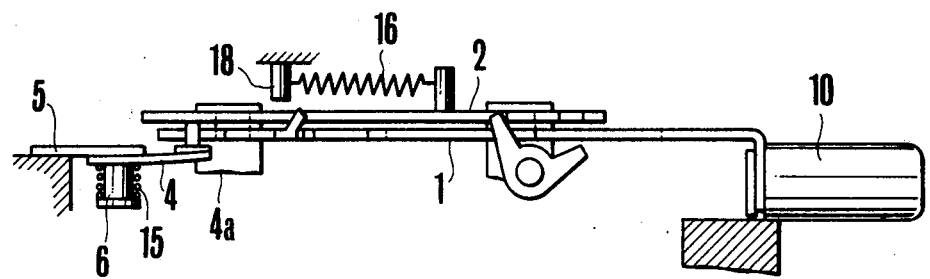
FIG. 7 is a side view of the mechanism shown in FIG. 6.
Figure 8:
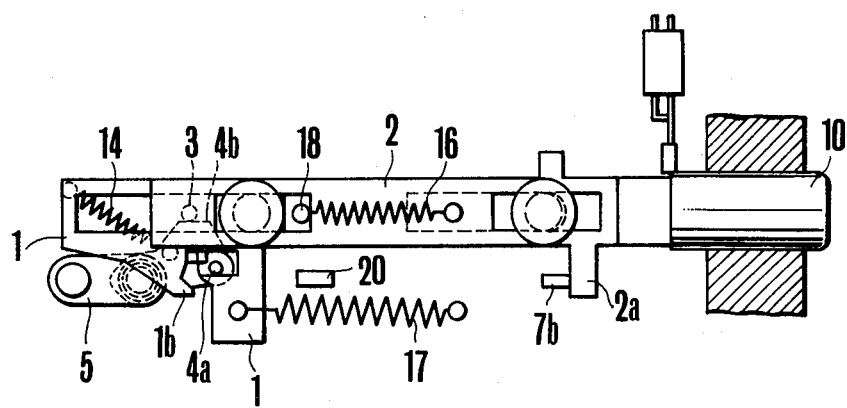
FIG. 8 is a plan view showing the change over mechanism of the device of FIG. 1 in the state where the diaphragm closing operation is prohibited in the shutter time preference photographing mode.
Figure 9:
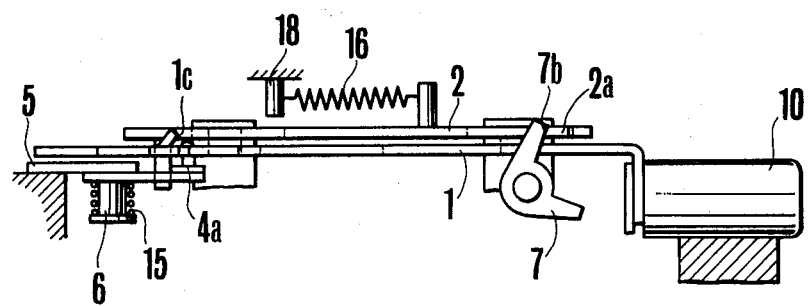
FIG. 9 is a side view of the mechanism shown in FIG. 8.

FIGS. 2 and 3 show the fully opened light measuring manual photographing state. The pin 4a of the diaphragm closing lock plate 4, which is engaged in the holding portion 1b of the diaphragm closing plate 1, holds the diaphragm closing plate 1 in the fully opened light measuring photographing position against the strength of the diaphragm closing spring 17 toward the diaphragm closing direction. When the diaphragm closing button 10 is depressed in this state, the diaphragm closing plate 1 moves to the left in FIGS. 2 and 3 so that the pin 4a of the diaphragm closing lock plate 4 is engaged with the bent part 1c of the diaphragm closing plate 1 with the rotation power of the closed diaphragm releasing spring 14 along the counterclockwise direction. When the diaphragm closing button 10 is depressed less in this state, the pin 4a of the diaphragm closing lock plate 4 brings the bent part 1c of the diaphragm closing plate 1 under the diaphragm closing plate 1, being moved with the strength of the diaphragm closing spring 17. This state is shown in FIGS. 4 and 5. The diaphragm closing plate 1 moves the diaphragm closing lever 20 by means of the strength stored in the diaphragm closing spring 17 up to the position determined by the end surface 1e of the slide guide part against the strength of a spring (not shown) urged along the diaphragm opening direction. On the other hand, the other end surface 1f of the hole 1h of the diaphragm closing plate 1 is in contact with the prohibition pin 3 so to move the change over plate 2 to the right. Thus, the prohibiting pin 3 is brought in contact with the ends 4c and then 4b of the diaphragm closing lock plate 4 and rotates the plate 4 along the clockwise direction in FIG. 4 so that the pin 4a of the diaphragm lock plate 4 under the diaphragm closing plate 1 projects again by means of the upward returning strength of the diaphragm closing lock spring when the diaphragm closing plate 1 has assumed the diaphragm closed light measuring state. Because the contact part 12a of the diaphragm closing switch 12 is moved with the projection 1a of the diaphragm closing plate 1 to the right so as to separate the switch contact 12c from 12b so that the switch 12 is opened. When the mode is changed over into the shutter time preference photographing mode with lens operation, the auto-manual signal pin 21 of the lens projects and the pin 8a of the auto-manual change over lever 8 closes the auto change over switch 11, whereby the diaphragm closing switch 12 is opened so that the mode is not changed over into the shutter time preference photographing mode but still remains in the manual photographing mode. This state is shown in FIGS. 6 and 7. When the projecting diaphragm closing button 10 is depressed in the diaphragm closed light measuring state the diaphragm closing plate 1 is moved to the left, while the pin 4a of the diaphragm lock plate 4 is moved along the clockwise direction, being guided with the part 1d of the diaphragm closing plate 1. The diaphragm closing button 10, which has been depressed until the pin 4a comes in contact with the part 1g of the diaphragm closing plate 1, cannot be depressed any more. When the diaphragm closing button 10 is no longer depressed in this state, the pin 4a is engaged with the holding part 1b of the diaphragm closing plate with the rotation power of the closed diaphragm releasing spring 14 along the counterclockwise direction, when the initial fully opened light measuring state is resumed. Below the shutter time preference photographing state is explained. When the camera in the fully opened light measuring manual photographing state is changed over into the shutter time preference photographing mode with the lens operation, the auto-manual signal pin 21 of the lens projects and the auto-manual change over lever 8 is rotated in operative engagement with the auto-manual change over pin 13. At this time, the pin 8a is brought in contact with the contact 11a of the auto change over switch 11 so as to close the switch 11 in such a manner that the control circuit is changed over into the shutter time preference photographing mode. Further, at the same time, the end 8c of the lever 8 rotates the intermediary lever 7. Consequently, in FIGS. 8 and 9, the end 7b of the intermediary lever 7 is operated to the right with the projection 2a of the change over plate 2. Although in this state, when the diaphragm closing button 10 is depressed, the closed diaphragm lock plate 4 rotates, the plate 4 does not operate until the pin 4a is engaged with the bent part 1c of the diaphragm closing plate 1 with the contact of the prohibition pin 3 with the end 4b. Consequently, when the diaphragm closing button 10 is freed, the pin 4a of the closed diaphragm lock plate 4 is again engaged with the holding part 1b of the diaphragm closing plate 1 and the fully opened light measuring state is maintained. Consequently, no matter which way the diaphragm closing button is depressed, the change over into the diaphragm closed light measuring photographing mode is prohibited, whereby no significant force is imparted to the change over member such as the closed diaphragm lock plate 4.

Figure 10:
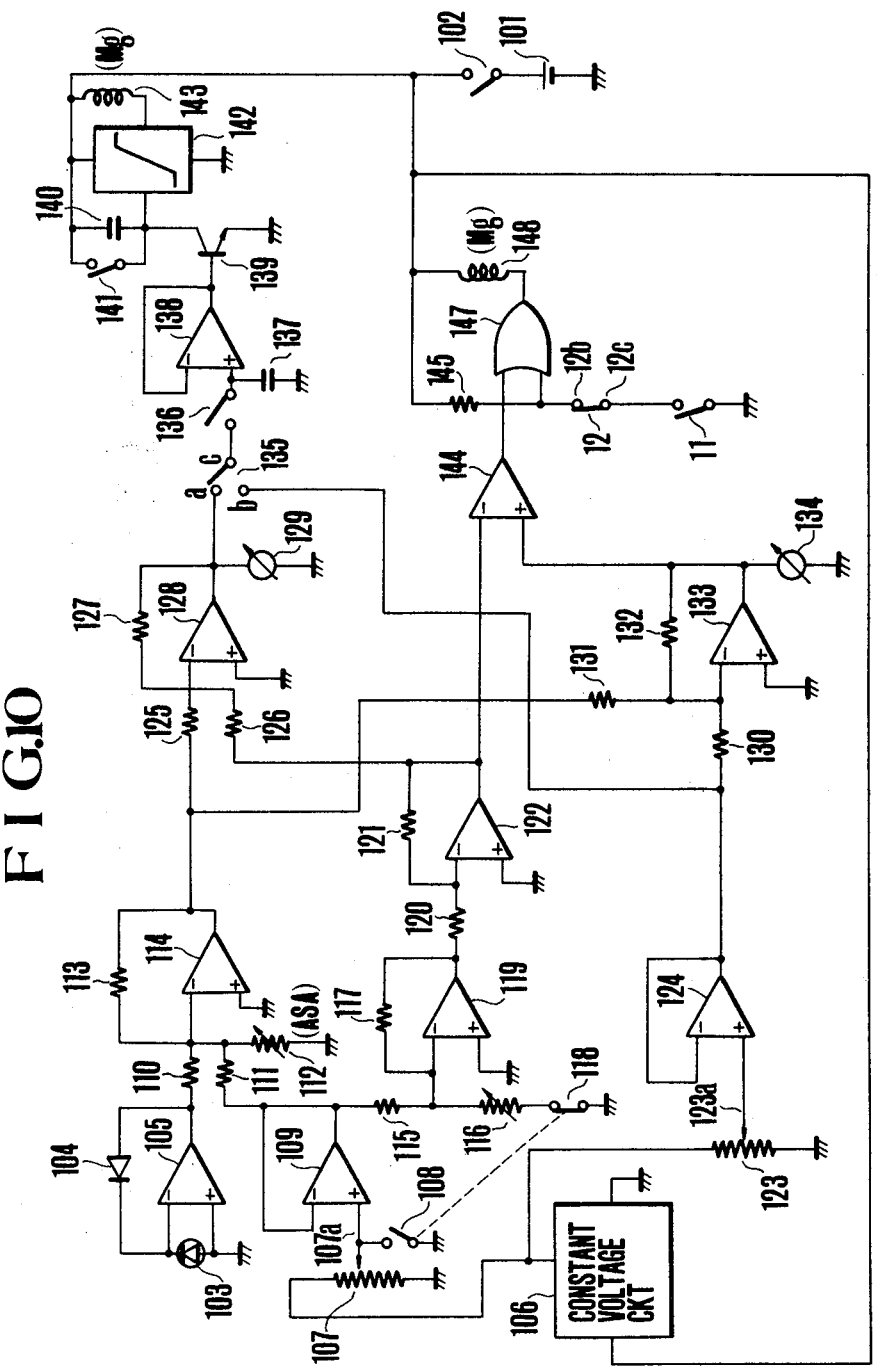
FIG. 10 is a circuit diagram of the exposure control circuit of a camera having the device shown in FIG. 1.

FIG. 10 shows the control circuit of the camera having the device shown in FIG. 1. In the drawing, a power source switch 101 and a power source switch 102 are operatively engaged with the first stroke of the shutter button. A light sensing element 103 produces a current proportional to the object brightness. A logarithmic compression diode 104 logarithmically compresses the current of the light sensing element 3, and an operational amplifier 105 (hereinafter called OP amplifier) logarithmically compresses the current of the light sensing element into a voltage together with the logarithmic compression diode. A constant voltage circuit 106 supplies constant voltage to a smallest F value information variable resistor 107. A variable terminal 107a produces a voltage corresponding to the set smallest F value and by means of a diaphragm closing switch 108, the diaphragm is closed when the switch is closed. Further, this diaphragm closing switch 108 is operatively engaged with the switch 118 in a manner to be explained later. The circuit includes a follower connected OP amplifier 109 and resistors 110 and 111. 112 is a film sensitivity information variable resistor and 113 is a resistor. 114 is an OP amplifier for calculating the object brightness information, the smallest F value information and film sensitivity information so as to produce a voltage corresponding to the exposure value Ev. 115 is a resistor and 116 is a diaphragm step number variable resistor from the smallest F value of the lens. 117 is a resistor and 118 is a diaphragm closing switch operatively engaged with the switch 108, whereby the diaphragm is closed when the switch is opened. 119 is an OP amplifier for calculating the smallest F value information and the diaphragm step number information so as to produce a voltage corresponding to the aperture value information of the lens. 120 and 121 are resistors and 122 inverses and amplifies the output of the OP amplifier 119. 123 is a shutter time information resistor supplied with a contact voltage from the constant voltage circuit 106. 123a is a variable terminal for producing a voltage corresponding to the set shutter time. 124 is a follower connected OP amplifier. 125, 126, and 127 are resistors. 128 is an OP amplifier for calculating the exposure value information and the aperture value information so as to produce a voltage corresponding to the shutter time. 129 is a display device for displaying the shutter time. 130, 131, and 132 are resistors and 133 is an OP amplifier for calculating exposure value information and shutter time information so as to produce a voltage corresponding to the aperture value information. 134 is a display device for displaying the aperture value. 135 is a change over switch whose terminal a is connected to the output of the OP amplifier 128 and whose terminal b is connected to the output of the OP amplifier 124. A terminal c is the common terminal connected to the movable terminal of a switch 136 to be explained later. The switch 136 is a memory switch to be opened in operative engagement with the motion of a mirror (not shown), and a memory condenser 137 has applied thereto the output of the OP amplifier 128 or the OP amplifier 134 in accordance with the state of the switch 135, whereby the voltage is stored in the condenser 137 while the switch 136 is opened. 138 is a follower connected OP amplifier, 139 is a logarithmic prolongation transistor, 140 is a condenser to be charged with the current of the transistor 139, and 141 is a count switch to be opened with the start of the leading shutter curtain. 142 is a Schmitt trigger circuit and 143 is a rear shutter curtain control magnet controlled by the Schmitt trigger circuit. 144 is a comparator for comparing the output of the OP amplifier 122 with that of the OP amplifier 133 in such a manner that when the voltage of the OP amplfier 122 is lower, the comparator 144 produces a low level output, while when the voltage of the OP amplifier 122 is higher, the comparator 144 produces a high level output. 145 is a resistor, 147 is an OR gate and 148 is an aperture value control magnet.

The operation of the control circuit will be explained with the fully opened light measuring shutter time preference operation being explained first.

In operative engagement with the first stroke of the shutter button, the switch 102 is closed so as to supply the voltage of the power source 101 to every part including the OP amplifiers. A current proportional to the object brightness flows through the light sensing element 3 and then logarithmically compressed with the OP amplifier 105 and the logarithmic compressing diode 104 into a voltage (Bvo), which is delivered from the OP amplifier 105. Then a constant voltage is delivered to the smallest F value information variable resistor 107 from the constant voltage circuit 106 in such a manner that a voltage corresponding to the smallest F value information set from the lens signal transmission terminal (not shown) is delivered from the variable terminal 107a to the follower connected OP amplifier 109 acting as a buffer amplifier, whereby a voltage corresponding to the smallest F value information (Avo) is delivered from the output of the OP amplifier 109. The voltage corresponding to the object brightness from the OP amplifier 105, the voltage corresponding to the smallest F value information from the OP amplifier 109 and the value of the film sensitivity information resistor 112 in operative engagement with the ASA dial are calculated with the resistors 110, 111, 113 and the OP amplifier 114 into $-Ev=(Bvo+Avo+Sv)\times(-1)$, the exposure value with the inversed sign. Further, the voltage of the diaphragm step number information variable resistor 116 set from the aperture signal transmission terminal and the voltage corresponding to the smallest F value information from the OP amplifier 109 are calculated with the resistors 115, 117 and the OP amplifier 119 into $-Av$, the aperture information with the inversed sign. Then the output of the OP amplifier 119 is inversely amplified with the resistors 120, 121 and the OP amplifier 122 into a voltage corresponding to the aperture information (Av). Further, a constant voltage is applied from the constant voltage circuit 106 to the shutter time information resistor 123 in operative engagement with the shutter dial 123 in such a manner that a voltage corresponding to the shutter time information (Tv) is delivered from the variable terminal 123a to the follower connected OP amplifier 124, which delivers a voltage corresponding to the shutter time information. The above voltage and the voltage corresponding to the exposure value information from the above OP amplifier 114 are calculated with the resistors 130, 131, 132 and the OP amplifier 133 into a voltage corresponding to the aperture information $Ai=(Tv-Ev)\times(-1)$, which is delivered from the OP amplifier 133 and displayed with the aperture value display device 134. In case the lens is now in the manual state, the aperture ring of the lens is set so as to correspond to the value displayed with the display device 134, whereby the proper exposure can be obtained with a second stroke of the shutter button. Assuming shutter time preference operation is set, the time is determined with the voltage from the OP amplifier 124 because the terminals b and c of the switch 135 are in the short-circuit state. The voltage from the OP amplifier 124 is stored in the memory condenser through the memory switch 136 which is closed when the shutter has been charged. The memory switch 136 is opened with operation of the mirror, whereby the voltage charged in the memory condenser 140 is stored. The above voltage is delivered directly to the OP amplifier 138 as the buffer amplifier. When the count switch 141 is opened in operative engagement with the start of the leading shutter curtain, the condenser 140 is charged with current, which is the output voltage of the OP amplifier 138 logarithmically prolonged with the transistor 139 until the voltage at the connecting point of the condenser 140 with the transistor 139 becomes lower than a certain determined value, when the output of the Schmitt trigger circuit 142 is inversed so as to interrupt the current supply to the magnet 143 in such a manner that the tail shutter curtain starts to run and complete the exposure.

When the lens is changed over from auto to manual, the auto change over switch 11 is closed. The initial aperture value information value is set at the largest aperture value, the second stroke of the shutter button is triggered and the aperture information resistor 116 charges from the largest aperture value side to the smallest aperture value side. That is, the output of the OP amplifier 133 producing a voltage corresponding to the calculated proper aperture information and the output of the OP amplifier 122 producing a voltage changing from the largest aperture value to the smallest aperture value are compared with the comparator 144 in such a manner that when the former voltage is higher than the latter, the level of the output of the comparator 144 becomes low. Then, the level of the input of the OR gate 147 becomes low and therefore that of the output of the gate 147 becomes low in such a manner that the current is supplied to the diaphragm control magnet 148 so as to fix the aperture value, raise the mirror, control the shutter and complete the exposure. Now, the manual diaphragm closed light measurement will be explained below. The operation with regard to shutter time is the same as previously described. With diaphragm closed light measurement, the switch 108 is closed and thus the terminal 107a of the smallest F value information resistor 107 is grounded, whereby the OP amplifier 109 delivers zero output. Because the amount of light incident upon the light sensing element 103 is reduced by the number of the diaphragm steps as compared with the case of the fully opened light measurement, the OP amplifier 105 delivers a voltage corresponding to the information value (Bv−Av), wherein Bv is the object brightness and Av is the aperture value. Then the film sensitivity information (Sv) is added, whereby a voltage corresponding to the information value (−Tv), which represents the calculated shutter time information with an inversed sign, is delivered from the OP amplifier 114. The above voltage and the output of the OP amplifier 124 delivering the shutter time information set at the shutter time dial are calculated, whereby the difference between the calculated shutter time and the set shutter time is delivered from the OP amplifier 133 and displayed with the display device 134. By rotating the shutter time dial, confirming with the display device that the above difference becomes zero, the proper exposure is determined. When the mode is changed over into the shutter time preference mode in the case of the diaphragm closed light measurement mode, the auto change over switch 11 is closed, whereby the diaphragm closing switch 12 is opened so that the operation is the same as in the case of the diaphragm closed light measurement mode. Below, the operation of the aperture value preference mode will be explained. In the case of the fully opened light measurement mode, the OP amplifier 104 delivers the information value (−Ev), which represents the exposure value with an inversed sign. This voltage and the output of the OP amplifier 122 producing a voltage corresponding to the aperture information are calculated with the resistors 125, 126, 127 and the OP amplifier 128 into $Tv=(Av-Ev)\times(-1)$, which constitutes a voltage corresponding to the proper shutter time, which is delivered from the OP amplifier 128 and displayed with the shutter time display device 129. In the case of the aperture value preference mode, the terminals $a_1$ and c of the switch 135 are short-circuited and the output voltage of the OP amplifier 128 is charged in the memory condenser 137 via the switch 136. Thereafter, in the same way as in the case of the shutter time preference mode, the current supply of the magnet 143 is interrupted so as to complete the exposure.

When the mode is changed over into the diaphragm closed light measurement mode, the switch 108 is opened, while the switch 118 is closed so that the output of the OP amplifier is zero, while one terminal of the diaphragm step number information resistor 116 is opened in such a manner that the output of the OP amplifier 119 is zero and further the output of the OP amplifier 122 is also zero. As a result, the input information of the OP amplifier 128 is only the output of the OP amplifier 114, whereby the OP amplifier 114 delivers a voltage (−Tv), the shutter time information with the inversed sign so that the OP amplifier 128 delivers a voltage corresponding to the shutter time information.

In the case of the above-described exposure control circuit and the diaphragm closing device, the diaphragm closing device in FIG. 1 is controlled with the operation of the diaphragm closing button 10 with reference to the auto-manual change over switch 11 and the diaphragm closing switch 12. In the case of the fully opened light measuring state, the diaphragm closing switch 12 is closed. In the case of the diaphragm closed light measuring state, the switch 12 is opened. The operation of the magnetic means 148 and that of the logic circuit 147 for controlling the aperture of the diaphragm closing device in accordance with the aperture value calculated from the shutter time information are controlled with the switch 12. Further, the auto-manual change over switch 11 is operatively engaged with the selection between the auto operation and the manual operation of the diaphragm closing device. Consequently, when the exposure control mode in FIG. 10 is set in the shutter time preference aperture value automatic set photographing mode and the diaphragm closing device is set in the diaphragm closing state in the case of the above composition, the aperture value is controlled manually and the camera can be operated with the preference on the manual photographing mode.

In this way, a picture can be taken without losing a photographic opportunity.

As mentioned above, in accordance with the present invention, the camera can be positively set in the manual photographing mode in order not to lose a photographic opportunity instead of providing, for example, a prohibiting circuit in the camera so as to prohibit shutter release when the diaphragm is closed in the shutter time preference mode.

While specific embodiments of the invention have been shown and described in detail to illustrate the application of the inventive principles, it will be understood that the invention may be embodied otherwise without departing from such principles.

What we claim:

1. A mode change over device for a camera having a diaphragm and capable of operating in a shutter time preference mode comprising:

diaphragm closing means for bringing said diaphragm from a fully opened state into a closed state;

operation means for operating said diaphragm closing means, said operation means moving between a first position in which said diaphragm is brought into the fully opened state by said diaphragm closing means and a second position in which said diaphragm is brought into the closed state by said diaphragm closing means;

lock means for locking said operation means in said first position;

release means for releasing the locked state of said lock means;

means for making the lock release operation of said lock means impossible; and mode selection means for controlling said means for making the lock release operation impossible, said mode selection means being operative when said shutter time preference mode is selected.

2. A mode change over device according to claim 1, wherein said operation means includes urging means for urging said operation means from said first position to said second position.

3. A mode change over device according to claim 1, further comprising:

diaphragm control means for automatically controlling said diaphragm, said diaphragm control means having a switch for making operation of said diaphragm control means possible, said switch being opened along with travel of said operation means to said second position.

* * * * *